United States Patent
Kaltenbach et al.

(10) Patent No.: US 6,892,848 B2
(45) Date of Patent: May 17, 2005

(54) STEERING SYSTEM

(75) Inventors: Johannes Kaltenbach, Friedrichshafen (DE); Ünal Gazyakan, Friedrichshafen (DE); Hartmut Werries, Bissendorf (DE); Christoph Pelchen, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/297,057

(22) PCT Filed: Jun. 23, 2001

(86) PCT No.: PCT/EP01/07145

§ 371 (c)(1),
(2), (4) Date: Dec. 2, 2002

(87) PCT Pub. No.: WO02/02391

PCT Pub. Date: Jan. 10, 2002

(65) Prior Publication Data

US 2004/0089498 A1 May 13, 2004

(30) Foreign Application Priority Data

Jul. 1, 2000 (DE) .......... 100 32 115

(51) Int. Cl.$^7$ ............... B62D 5/04
(52) U.S. Cl. ........... 180/402; 180/446; 701/41
(58) Field of Search ............ 180/402, 403, 180/443, 446; 701/41, 42, 43

(56) References Cited

U.S. PATENT DOCUMENTS

| | | | |
|---|---|---|---|
| 5,347,458 A | * 9/1994 | Serizawa et al. | 701/41 |
| 5,828,972 A | 10/1998 | Asanuma et al. | 180/446 |
| 6,032,757 A | 3/2000 | Kawaguchi et al. | 180/446 |
| 6,041,882 A | * 3/2000 | Bohner et al. | 180/402 |
| 6,082,482 A | * 7/2000 | Kato et al. | 180/402 |
| 6,095,277 A | 8/2000 | Bohner et al. | 180/403 |
| 6,279,675 B1 | 8/2001 | Bohner et al. | 180/403 |
| 6,474,436 B1 | * 11/2002 | Konigorski | 180/402 |
| 6,604,036 B2 | * 8/2003 | Pallot | 701/48 |

FOREIGN PATENT DOCUMENTS

| | | | |
|---|---|---|---|
| DE | 42 32 256 A1 | 4/1993 | B62D/6/04 |
| DE | 196 50 475 C1 | 4/1998 | B62D/6/00 |
| DE | 198 01 974 A1 | 7/1998 | B62D/5/04 |
| DE | 198 39 953 A1 | 3/2000 | B62D/5/30 |
| GB | 2 344 326 A | 6/2000 | B62D/5/00 |

* cited by examiner

Primary Examiner—Anne Marie Boehler
(74) Attorney, Agent, or Firm—Davis & Bujold, P.L.L.C.

(57) ABSTRACT

A steering system with at least one steering wheel actuator and at least one steering actuator which are connected to each other via a controlled system. Minimal steering impulses being superimposed in order to be able to determine the steering tie rod forces that occur.

5 Claims, 1 Drawing Sheet

STEERING SYSTEM

FIELD OF THE INVENTION

The invention concerns a steering system.

BACKGROUND OF THE INVENTION

Steering systems which operate according to the steer-by-wire principle differ from conventional steering systems in that there is no mechanical link between the steering wheel and the steered wheel. Owing to the separateness of this steering system, the torque applied by virtue of the steering column to the steering wheel in a conventional systems is absent. The steering sensation previously determined by the road, the tires, the chassis and the transmission behavior, is instead produced by a steering wheel actuator. The forces and torques detected by one or more force and torque sensors in the steering linkages of the steered wheels are input to a central control unit. Via a steering wheel actuator, a reaction is passed on to the driver as a function of the operating conditions at the time, and this reaction being similar to the forces and torques that occur with a conventional steering system.

During driving, force and torque sensors in the steering linkages of the steering wheels deliver force signals which are proportional to the steering forces occurring at the steered wheels. The highest forces and torques are detected, evaluated by a control unit, and passed on to the steering wheel actuator to produce a torque on the steering wheel. The steering wheel actuator is controlled in such a manner that the turning resistance or torque variation, perceived by the driver, corresponds to that which would be provided by a conventional steering system when equivalent force and torque effects occur in the steering linkage.

To be able to produce an artificial reaction at the steering wheel actuator, the steering tie rod force occurring as a wheel reaction must be detected. This measured parameter then serves to regulate the necessary steering torque at the steering wheel.

From the prior art it is known, in steering systems comprising an electric motor in the steering actuator, to determine the steering tie rod forces by measuring the motor current. In steering systems with hydraulic steering actuators, the steering tie rod forces are determined by a pressure measurement. In the case of low steering tie rod forces, such as those that occur when driving straight ahead, however, the disadvantage is that the measurements of the motor current or pressure occurring react insensitively because of friction and damping influences, and this so leads to an inaccurate result. The consequence of this is that the centering sensation, passed on to the driver, is poor which, in turn, leads to insecure driving behavior.

The purpose of the present invention is to present a steering system in which even small changes of the steering tie rod forces are passed on to the driver in such manner that he or she experiences a more secure driving sensation.

The objective of the invention is achieved by a steering system of the type described.

SUMMARY OF THE INVENTION

By virtue of the controlled superimposition of minimal steering impulses, which cannot be individually perceived by the driver, the sensitivity of the steering system can be greatly improved such that even with small steering tie rod forces satisfactory feedback is provided to the driver.

BRIEF DESCRIPTION OF THE DRAWING

The invention will now be described, by way of example, with reference to

DETAILED DESCRIPTION OF THE INVENTION

Figure 1:
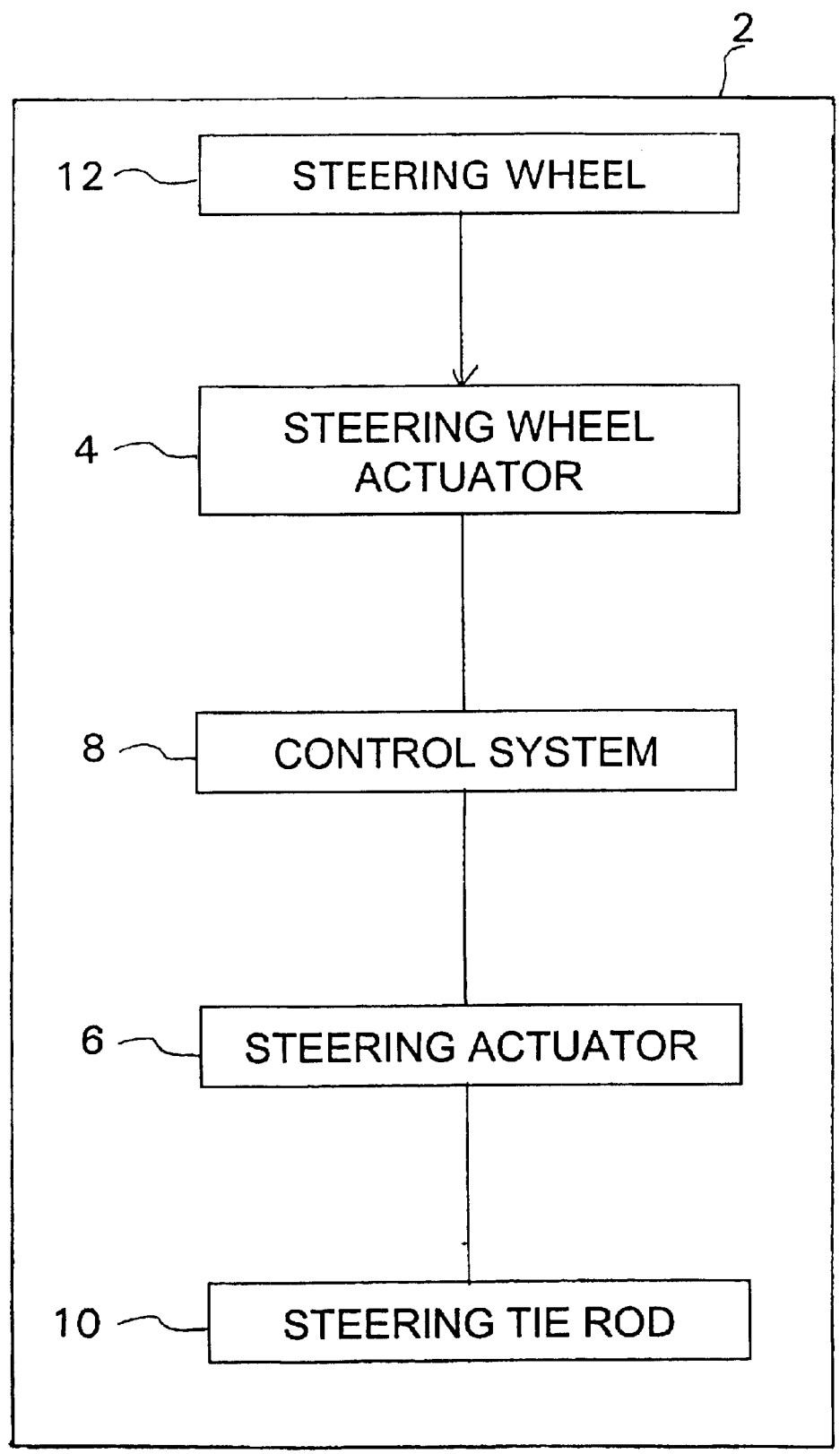
FIG. 1 is a steering system.

In steering system according to the invention minimal steering impulses in the form of sinusoidal oscillations, which the driver cannot perceive as rolling or yawing movements, are superimposed. These minimal steering impulses are, as a rule, smaller than one degree of a sine-steering angle with respect to the steering wheel. If now, for example, the static traction force of a rack-bar of a steering actuator amounts to 200 N, then it can be determined from the sides of the sinusoidal oscillation how large the force to be applied in both directions by the electric motor should be. If the force to be applied by the electric motor in one direction, corresponding to one side of the sinusoidal oscuillation, is 150 N and in the other direction is 250 N, it can be concluded from this that the externally applied steering tie rod force is equal to 50 N.

FIG. 1 diagrammatically shows a steering system 2 having at least a steering wheel actuator 4 and at least a steering actuator 6 connected together via a controlled system 8. Minimal steering impulses are superimposed in the steering system 2 in order to be able to determine forces that occur on a steering tie rod 10 of the steering system 2. The steering impulses are sinusoidal oscillations superimposed in the steering system 2. The steering actuator 6 comprises an electric motor which can act upon a steering mechanism of a power-assisted steering system. The steering wheel actuator 4 comprises an electric motor which transmits a torque, via a steering wheel 12, back to a driver.

What is claimed is:

1. A steering system for a motor vehicle comprising:

a steering wheel actuator for applying a torque to a steering wheel corresponding to a force acting on a steering tie rod of the steering system;

a road wheel steering actuator for controlling road wheels of the motor vehicle connected to the steering wheel actuator via an electronic steering control system; and wherein minimal steering impulses applied to road wheels of the motor vehicle are superimposed in the electronic steering control system and compare to static forces necessary to turn the steering wheel in order to determine the force acting on the steering tie rod of the steering system.

2. The steering system according to claim 1, wherein the steering wheel actuator comprises an electric motor which transmits feed back in the form of a torque corresponding to the force acting on the steering tie rod, via the steering wheel, back to the driver.

3. The steering system according to claim 2, wherein the minimal steering impulses applied to the road wheels of the motor vehicle are superimposed in the electronic steering control system to form a sinusoidal oscillating curve which is compared to the static force necessary to turn the steering wheel.

4. The steering system according to claim 3, the force acting on the steering tie rod of the steering system is a value determined by a magnitude of the sinusoidal oscillating curve which is compared to the static force necessary to turn the steering wheel.

5. The steering system according to claim 1, wherein the steering wheel actuator comprises an electric motor which can act upon a steering mechanism of a power-assisted steering system.

* * * * *